(No Model.)
A. PATTERSON.
THERMO ELECTRIC BATTERY.
No. 255,885.  Patented Apr. 4, 1882.
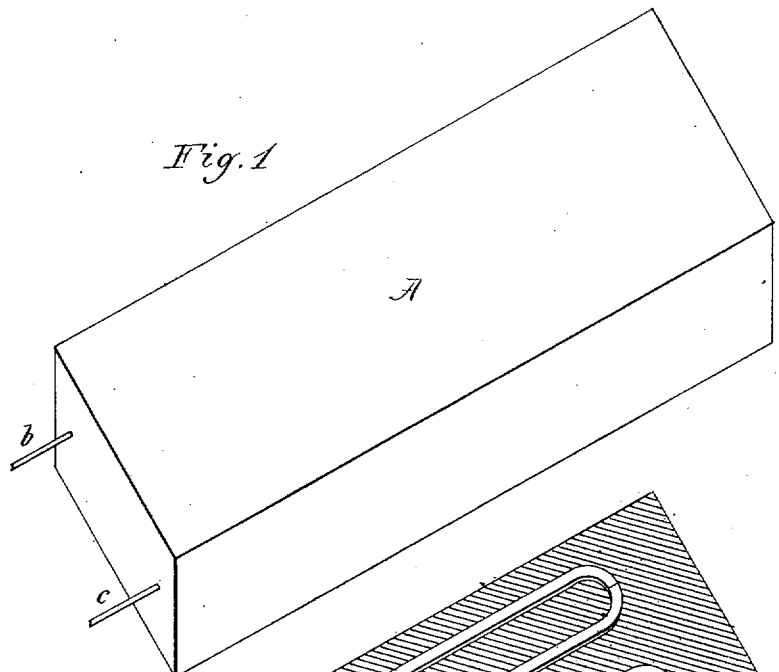
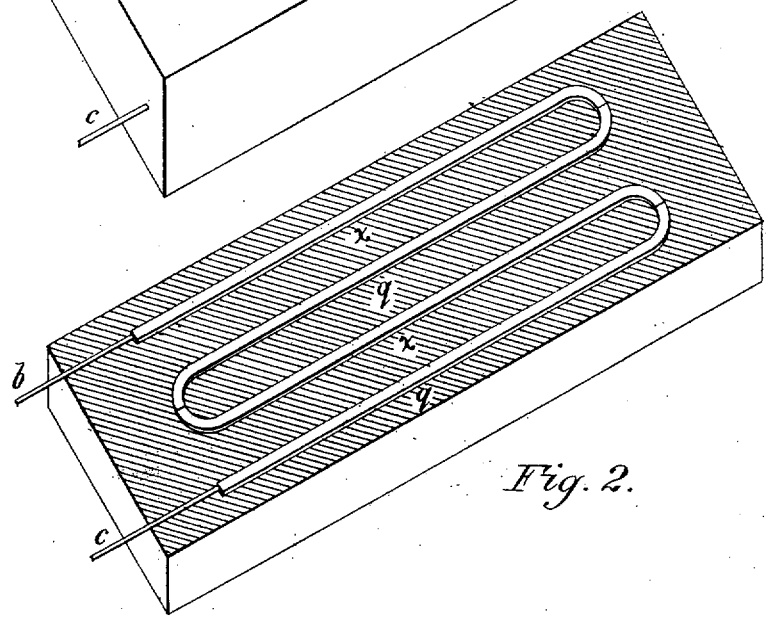
Witnesses.
Aly Scott
R. McDonald
Inventor.
Andrew Patterson

UNITED STATES PATENT OFFICE.

ANDREW PATTERSON, OF IDLEWOOD, PENNSYLVANIA.

THERMO-ELECTRIC BATTERY.

SPECIFICATION forming part of Letters Patent No. 255,885, dated April 4, 1882.

Application filed January 9, 1882. (No model.)

*To all whom it may concern:*

Be it known that I, ANDREW PATTERSON, a citizen of the United States, residing at Idlewood, Allegheny county, State of Pennsylvania, have invented certain new and useful Improvements in the Construction and Arrangement of Thermo-Electric Batteries; and I hereby declare that the following is a full, clear, and exact description of the invention, which will enable others skilled in the art to which it appertains to make and use the same.

The object of my invention is to give a more effective and economical development of electro-motive force by the action of heat on dissimilar metals or other electro excitable substances associated in the manner known as thermo-electric couples, series, or batteries.

Heretofore thermo-electric apparatus having been used chiefly, if not wholly, for the mere illustration of electric phenomena, and for the determination of temperatures, it has been usual, with a view to obtaining the greatest sensibility to heat, to leave the parts to be heated exposed to the direct action of the source of heat. This practice has interfered with the practical use of metals or other substances which are fusible or oxidable at temperatures which otherwise could be advantageously or conveniently employed with such fusible or oxidable materials, constituting one or both members of such thermo-electric couple.

My invention consists, in part, in inclosing the members of a thermo-electric couple or a series of such couples in a refractory insulating-envelope, so that I may apply any desirable degree of heat without danger of injury to the apparatus from the fusion or oxidation of any part of it, thus securing a more energetic, if a less sensitive, apparatus.

Second. To further assure impunity from injury in case of the fusion of one or both members of the "couple," I arrange them in such relative positions that if one or both become fused no disarrangement will result. These relative positions are determined as follows: If both metals are fusible at any temperature to which they are likely to be exposed, I place the one of greatest specific gravity in the inferior position, or below the one of less specific gravity, so that each will retain its position when both are in the fused state. If only one is likely to become fused, I place that one below the other, without reference to its specific gravity.

Third. My invention consists, further, in arranging one or more thermo-electric couples in a refractory insulating-envelope of the general form and material of an ordinary fire or furnace brick, so that such "electric bricks" may be built or inserted in the walls or "stacks" of furnaces intended for ordinary industrial uses, and thus afford means of utilizing the waste heat of such furnace in the development of a valuable electro-motive force. It will in most cases be found desirable that these electric bricks shall not be a part of the permanent structure of the furnace or stack, but that they shall be inserted in suitable perforations in the walls of the furnace, so that in case of casual injury they may be removed singly without disturbing other parts, and also so that they may be adjusted to greater or less degrees of heat, if desired. The shape, size, number, &c., of these perforations in any furnace will of course be made to correspond with the same relations of the electric bricks to be inserted in them, and will in each case be determined by its own peculiarities. It will also be understood that, apart from this mode of utilizing the waste heat of furnaces built and used for ordinary purposes, these electric bricks are intended to be built or inserted into furnaces built expressly for the production of electro-motive force by this mode.

For ordinary practical uses any good fire-brick clay will answer well for the material of the brick envelope, and will sufficiently insulate the metallic parts; but molded forms of glass or porcelain, with suitable recesses to receive the metallic parts, will be preferable for many purposes. When such envelopes are used the metallic parts, after being properly placed, can be covered and fully inclosed by clay or any other suitable material.

In constructing a clay brick or envelope to inclose one or more couples the clay may be first molded into the requisite shape, including recesses for the metallic parts, and after it is dried and fired the metallic parts may be inserted and the whole then sealed up with a proper quantity of plastic clay; or the metallic parts may be first arranged and properly attached and then solidly embedded in the plastic clay, and afterward dried and fired to give the necessary firmness, when the brick will be complete.

With this general explanation of my invention and such reference to the accompanying drawings as follows my invention will be sufficiently illustrated.

Figure 1 in the drawings is a perspective view of a common fire or furnace brick in which is embedded a series of thermo-electric pairs of the ordinary and usual construction, the end conductors of copper, $b\ c$, projecting from the anterior or front end of the brick, so as to be connected with the outer circuit or with other similar bricks to form a more extended series or battery.

Fig. 2 is a horizontal section of Fig. 1, showing the relative position of two ordinary thermo electric couples embedded in the refractory insulating mass or envelope described above, $x\ x$ being the positive and $q\ q$ the negative elements of the couples, $b\ c$ being the end conductors to form the outer circuit.

Fig. 3 is a longitudinal vertical section of a single couple in its envelope, showing the proper relative positions to be given to the particular members or elements of the couple with reference to the fusibility of one or both. When only one is fusible at the temperature to be used that one should be placed below the other, as at $q$, Fig. 3. When both are fusible the one of greater specific gravity should be given the inferior or lower position.

Having thus constructed any required number of thermo-electric couples, and having arranged them properly in their insulating-envelope, whether in the form of bricks or otherwise, and further arranged them as hereinbefore described, or otherwise, for the proper application of heat and connected them together by their conductors and with the outer circuit, in the same manner that a series of chemical or galvanic elements are connected, on the application of the proper degree of heat to the posterior end of such brick or other envelope there will be developed in the system an electro-motive force determined by the thermo-electric energy of the couples, the number of the couples, and the resistances, which force or current may be applied to any useful purpose to which an equal current from any other source could be applied.

Having thus fully described my invention, what I claim, and desire to secure by Letters Patent, is—

1. The combination of the members of a thermo-electric couple with a mass of refractory insulating materials in which they are embedded, whereby fusible or oxidable materials may be used for the couple without injury from fusion or oxidation, substantially as described and set forth.

2. A mass of refractory insulating material having embedded therein one or more thermo-electric couples, consisting of fusible and infusible elements, the fusible element of each pair being placed below the infusible one, as and for the purpose specified.

3. A mass of refractory insulating material having embedded therein one or more thermo-electric couples, consisting of two fusible elements, the member or element of greater specific gravity being placed below the one of less specific gravity, as and for the purpose specified.

4. As a new article of manufacture, a thermo-electric brick consisting of a mass of refractory insulating material enveloping one or more thermo-electric couples, substantially as described and shown.

ANDREW PATTERSON.

Witnesses:
 GEO. N. MONRO,
 W. B. YATES.